Sept. 19, 1939.　　　　P. R. FORMAN　　　　2,173,475
DOOR-OPERATING MECHANISM
Filed Nov. 30, 1935　　11 Sheets-Sheet 2
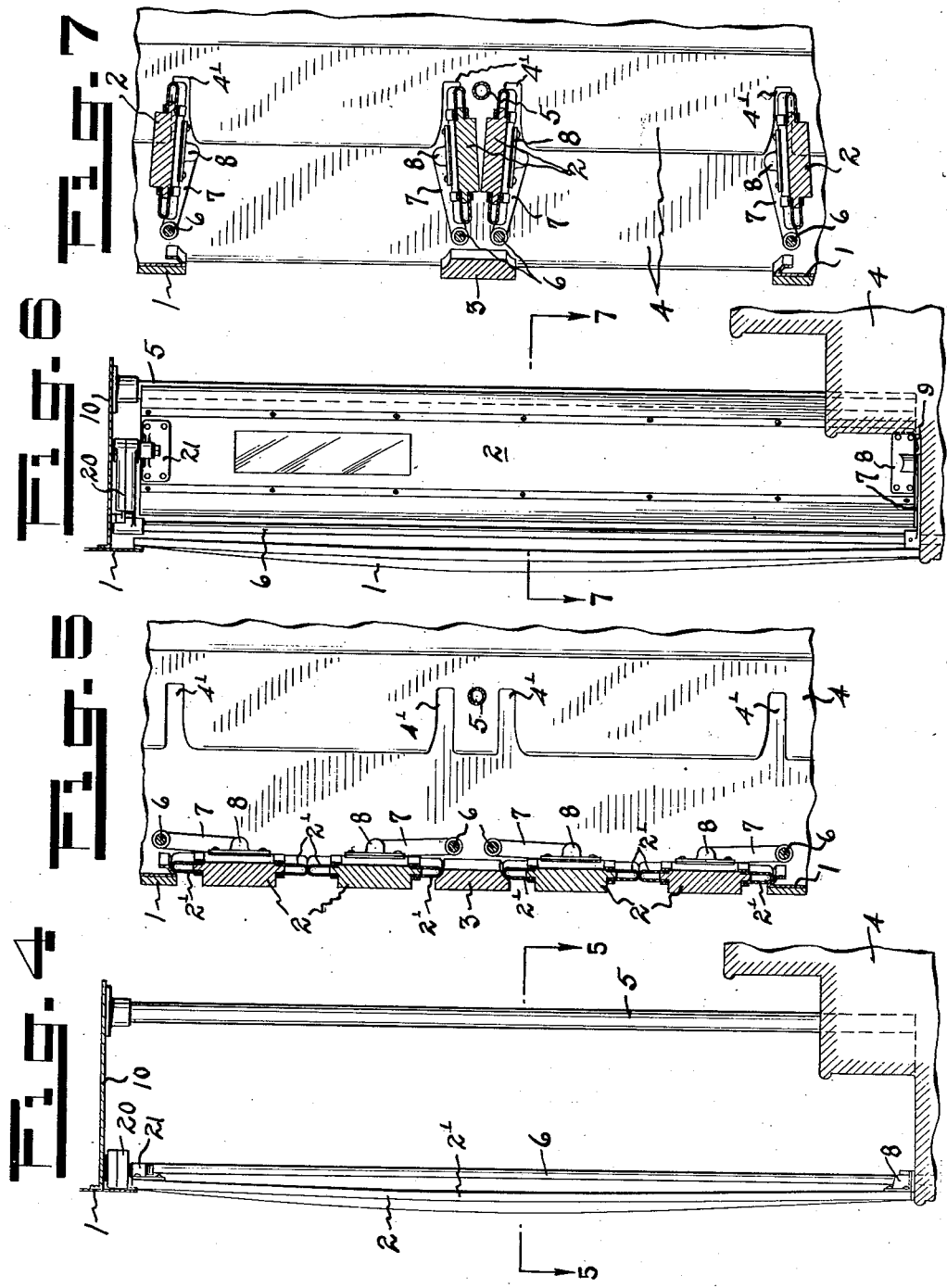
INVENTOR.
Paris R. Forman
BY
Darby & Darby
ATTORNEYS

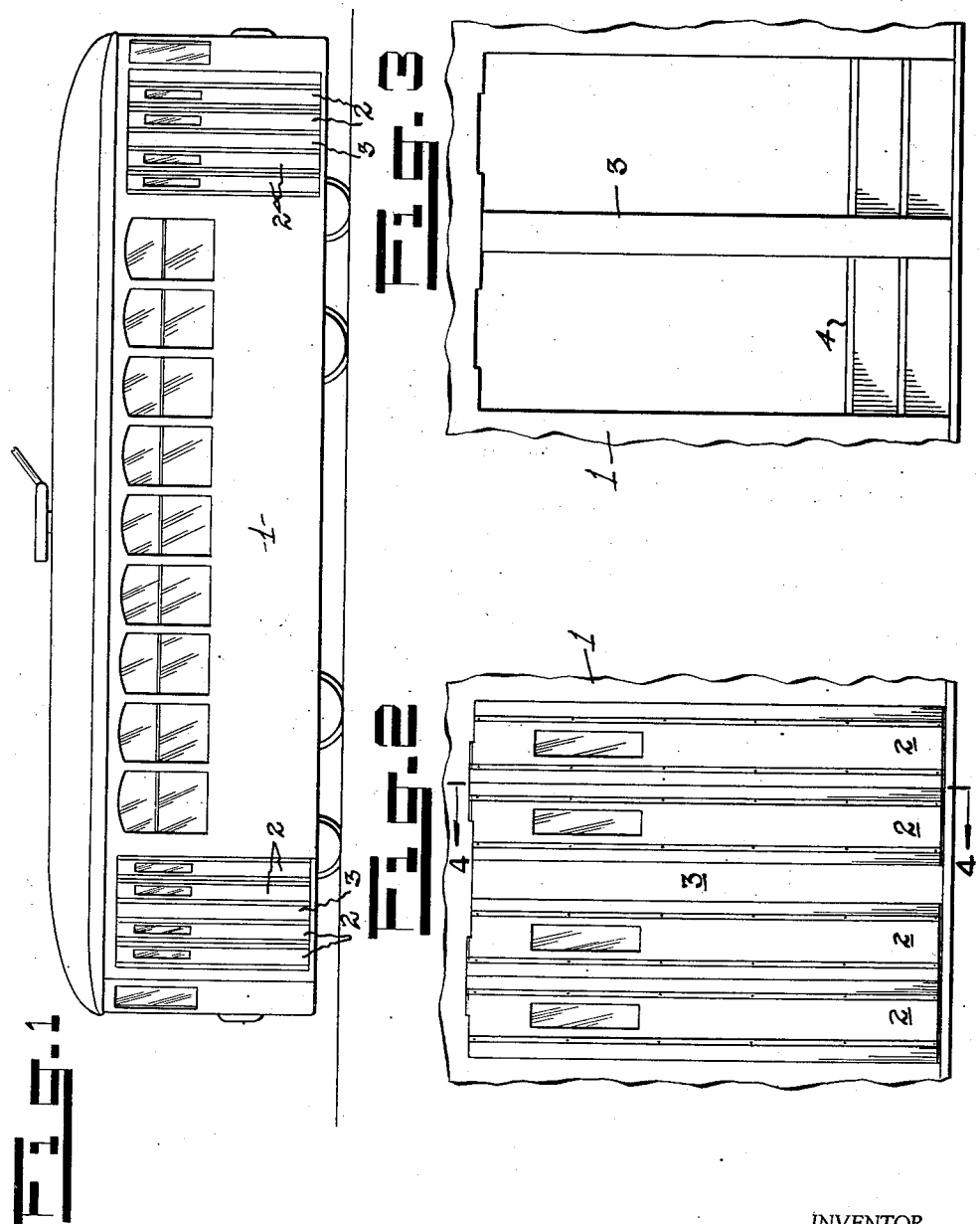

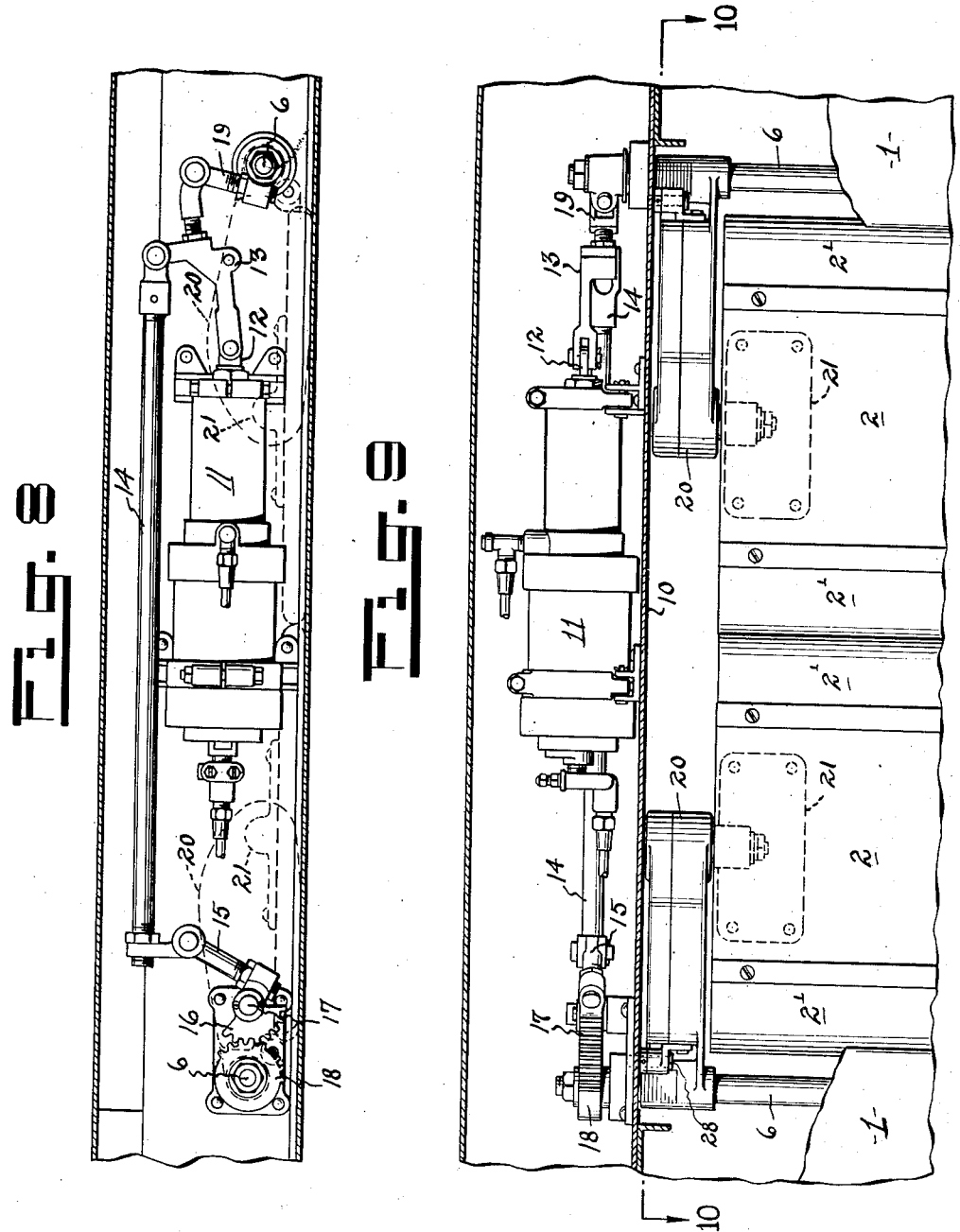

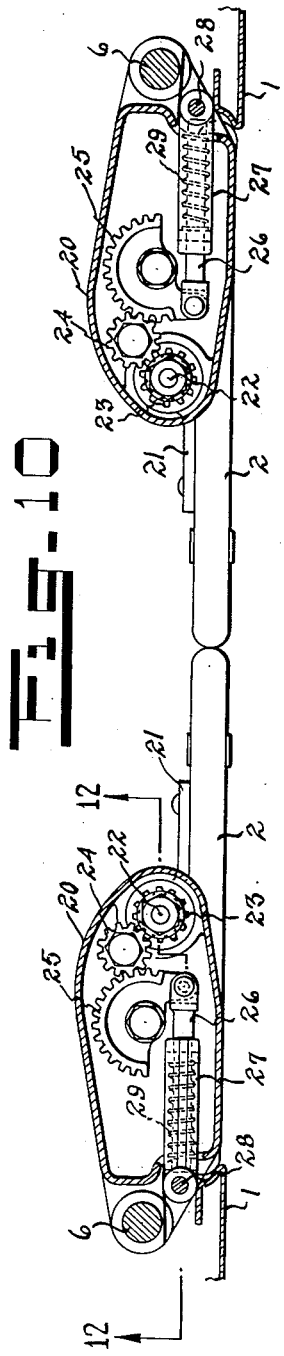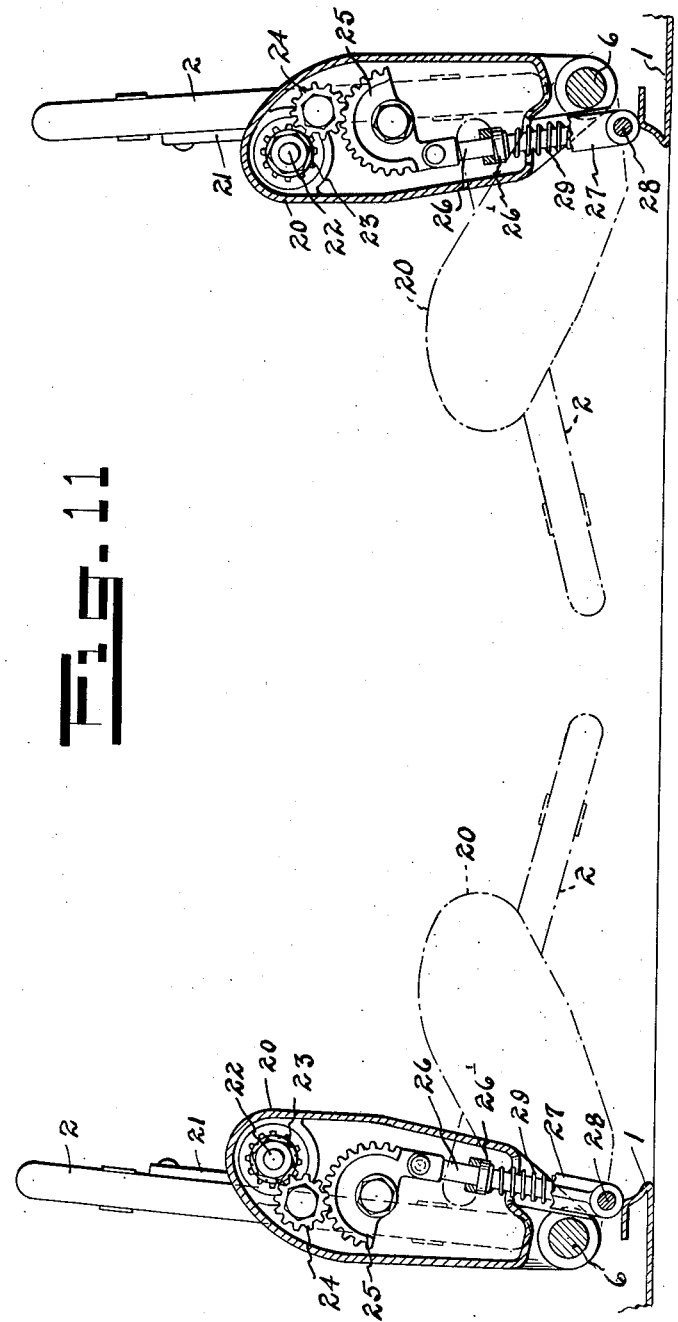

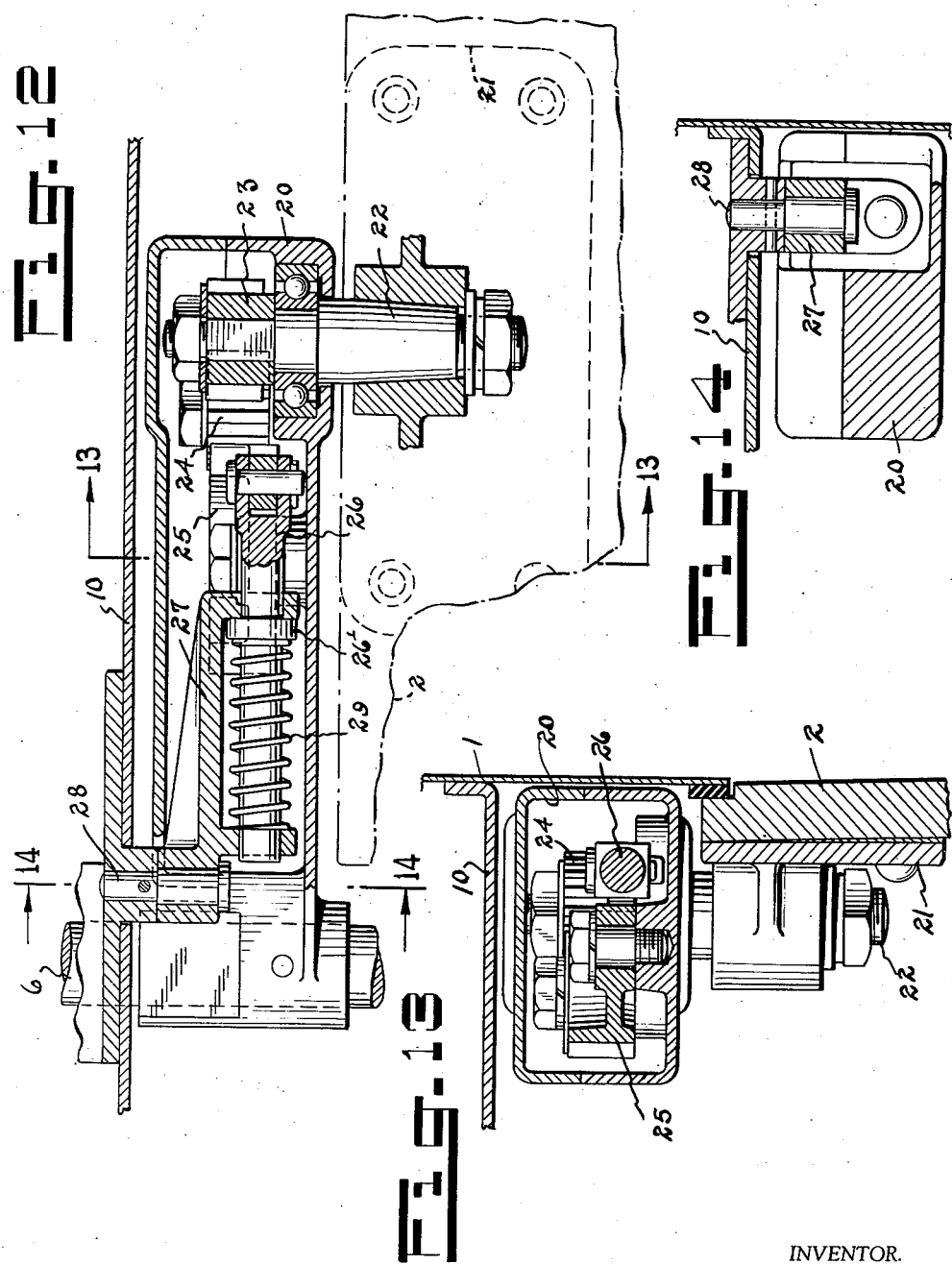

Sept. 19, 1939.  P. R. FORMAN  2,173,475
DOOR-OPERATING MECHANISM
Filed Nov. 30, 1935  11 Sheets-Sheet 6
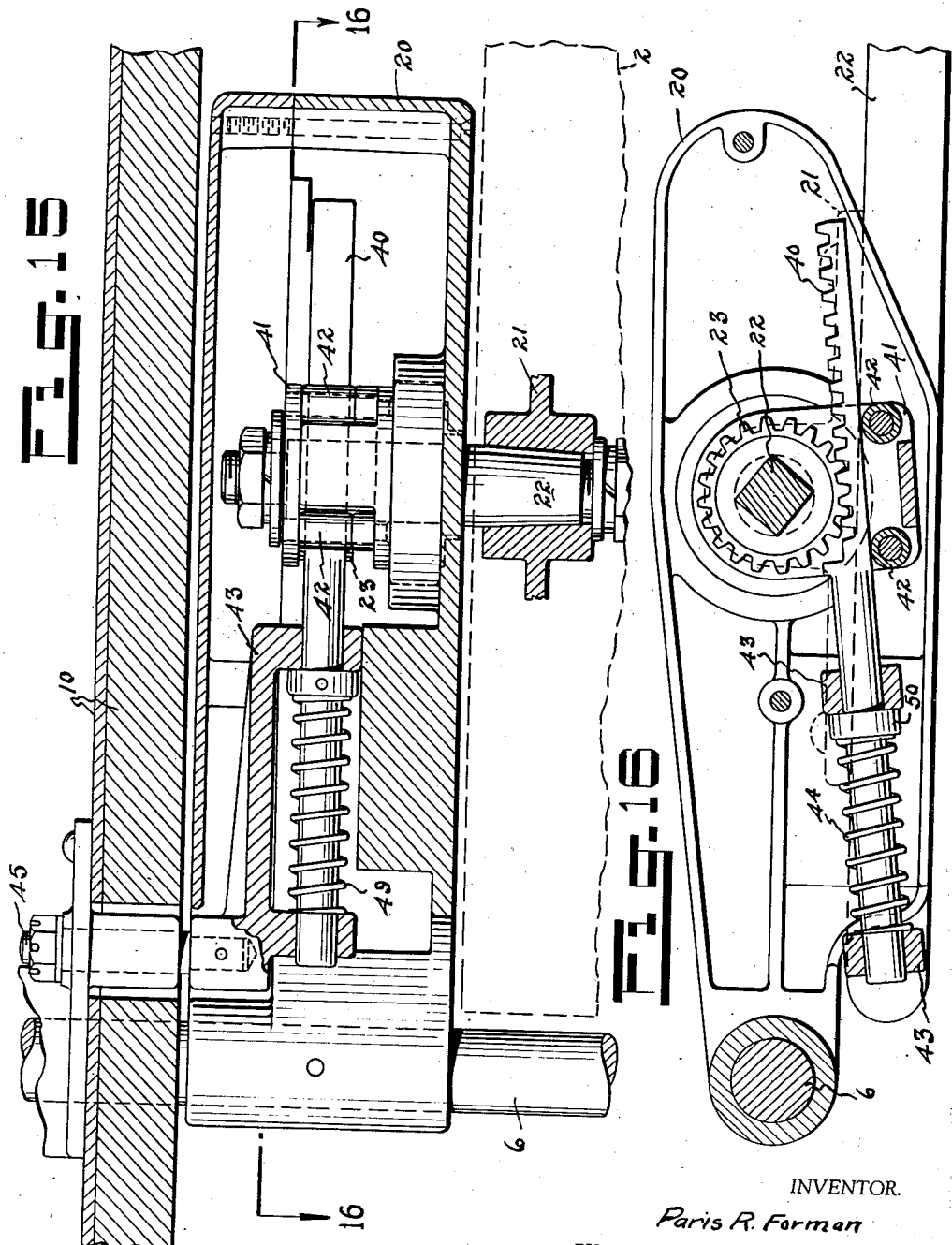
INVENTOR.
Paris R. Forman
BY
Darby & Darby.
ATTORNEYS

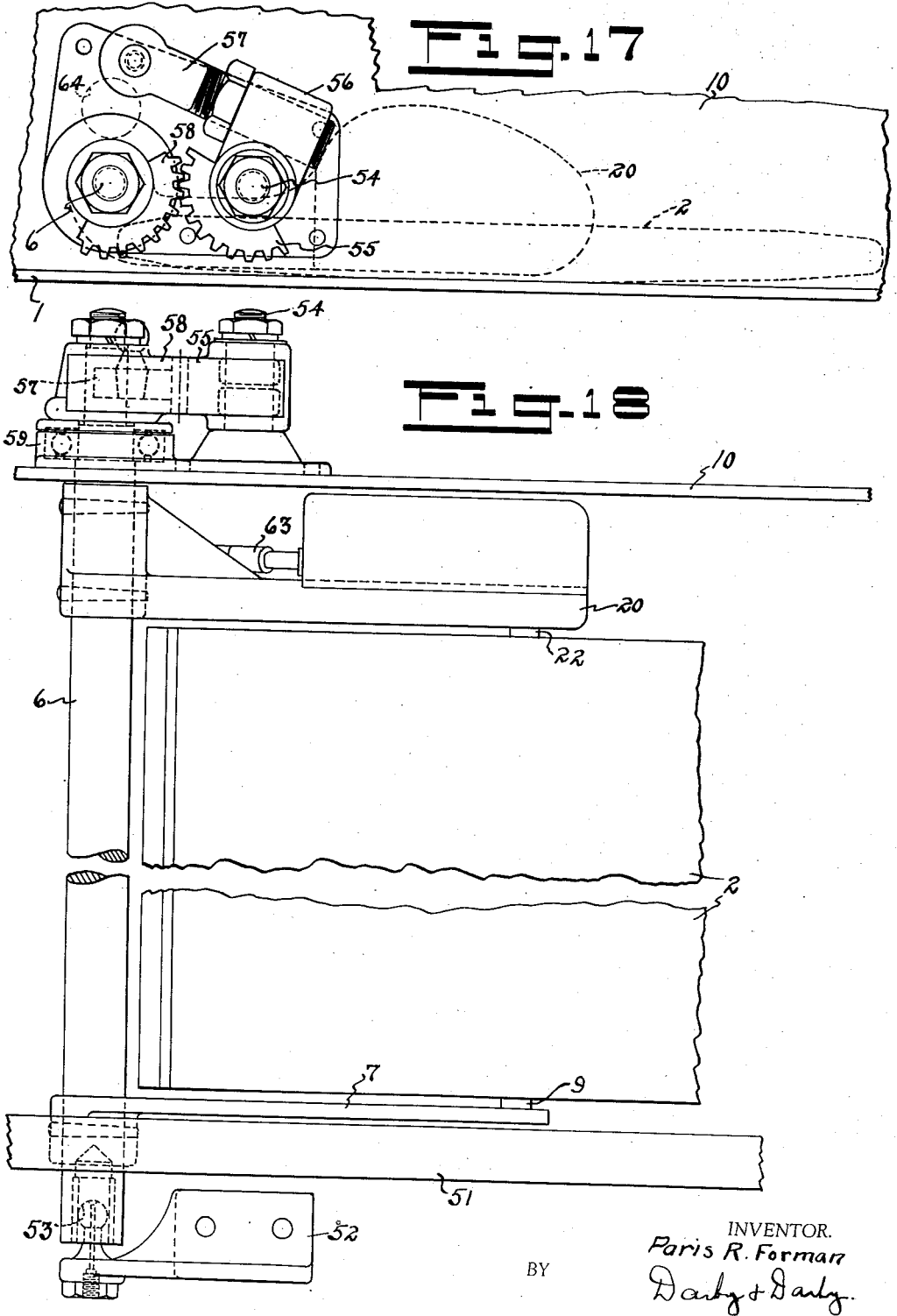

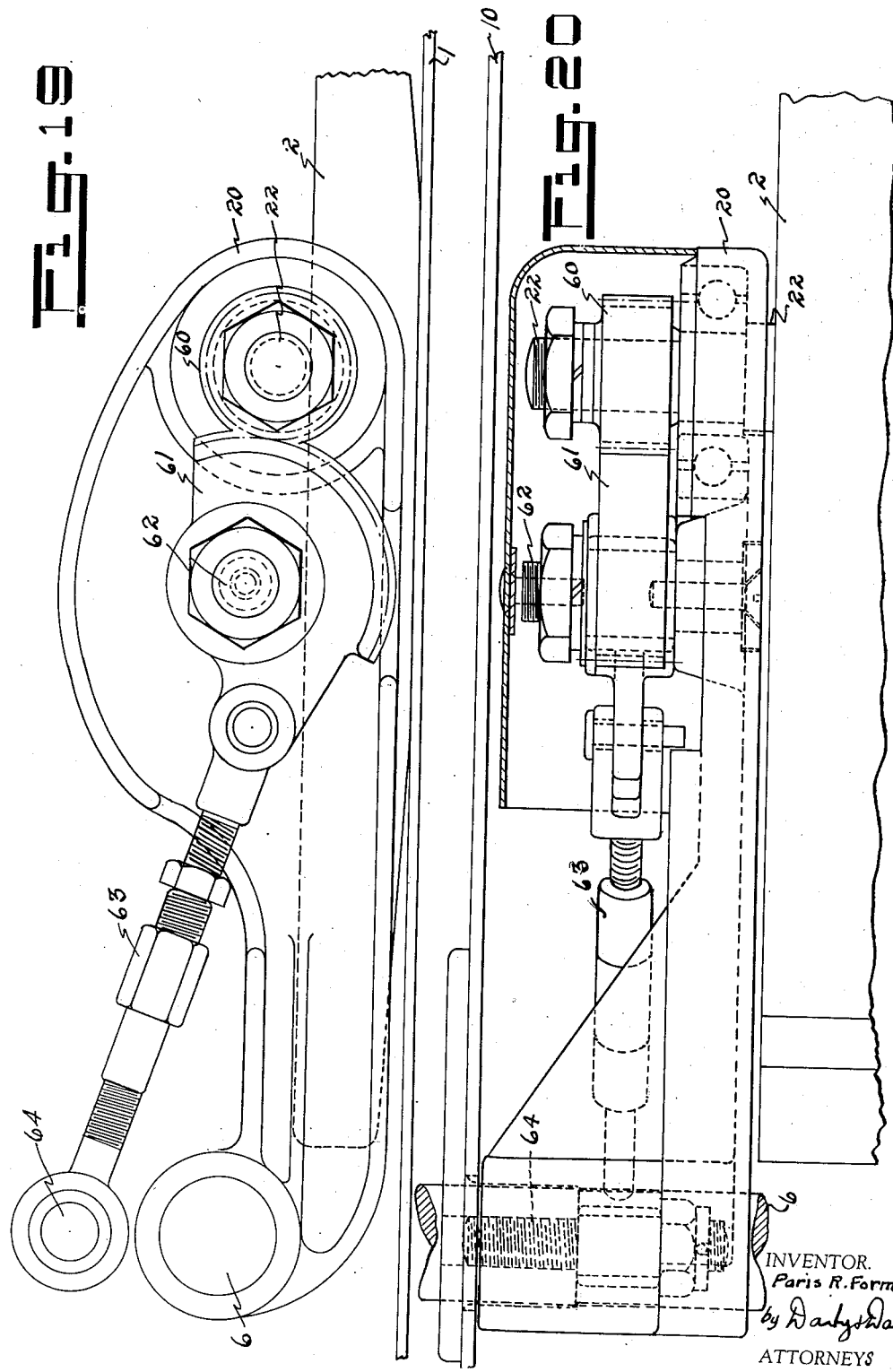

Sept. 19, 1939.   P. R. FORMAN   2,173,475
DOOR-OPERATING MECHANISM
Filed Nov. 30, 1935   11 Sheets-Sheet 9

INVENTOR.
Paris R. Forman
BY
ATTORNEYS

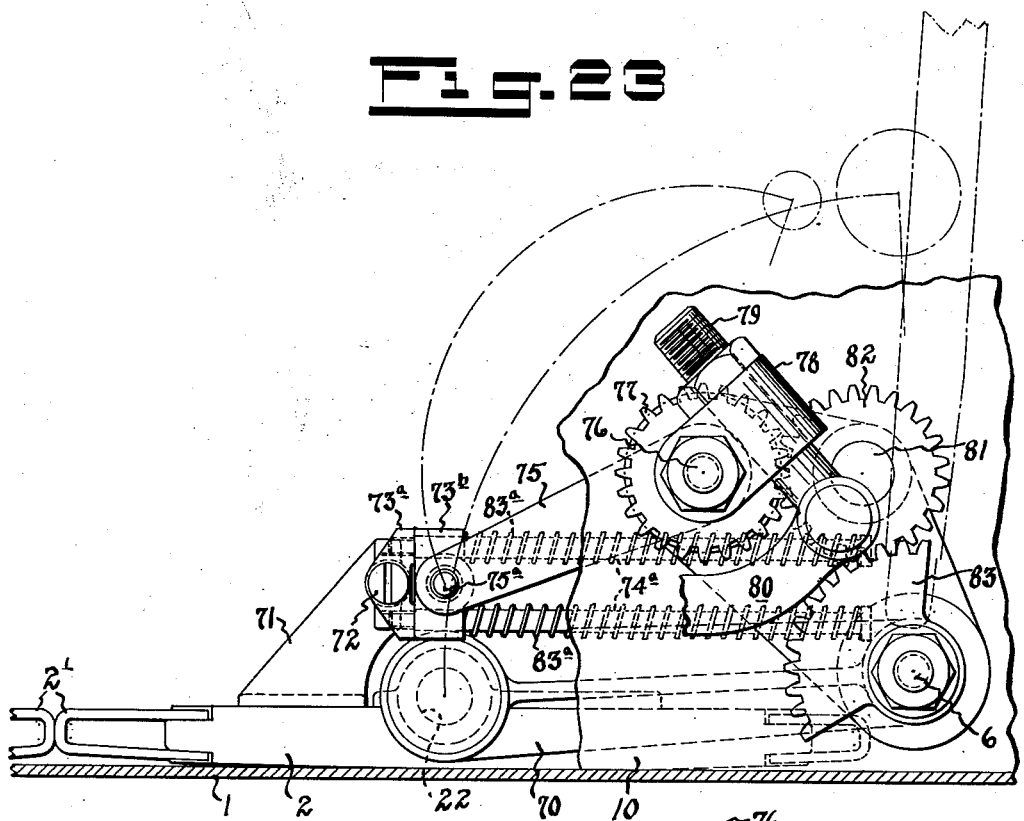
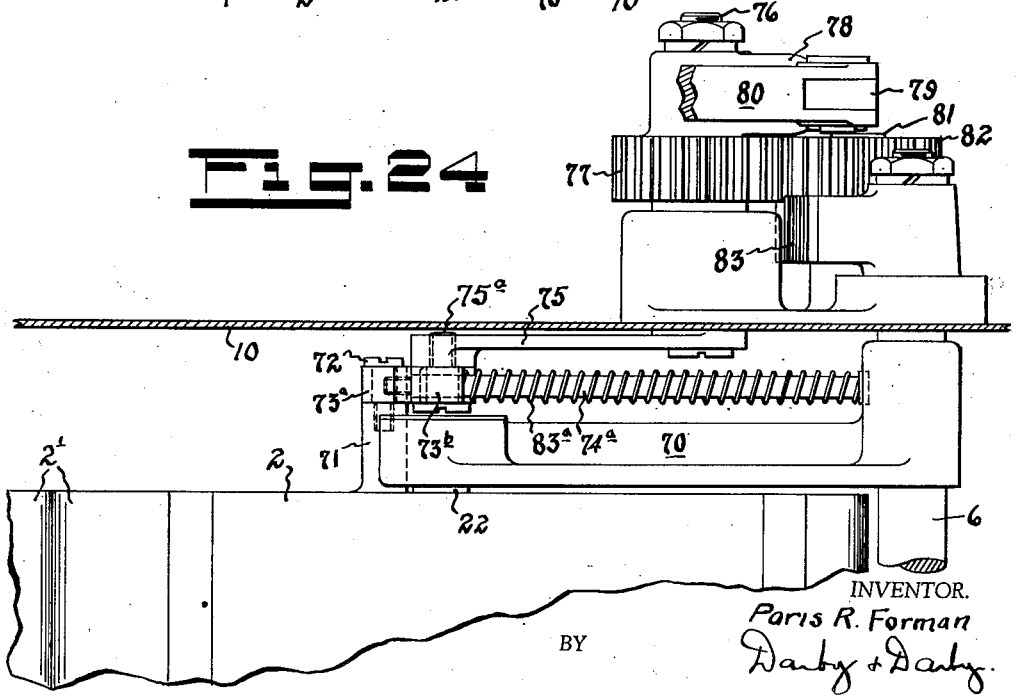

Sept. 19, 1939.  P. R. FORMAN  2,173,475
DOOR-OPERATING MECHANISM
Filed Nov. 30, 1935  11 Sheets-Sheet 11
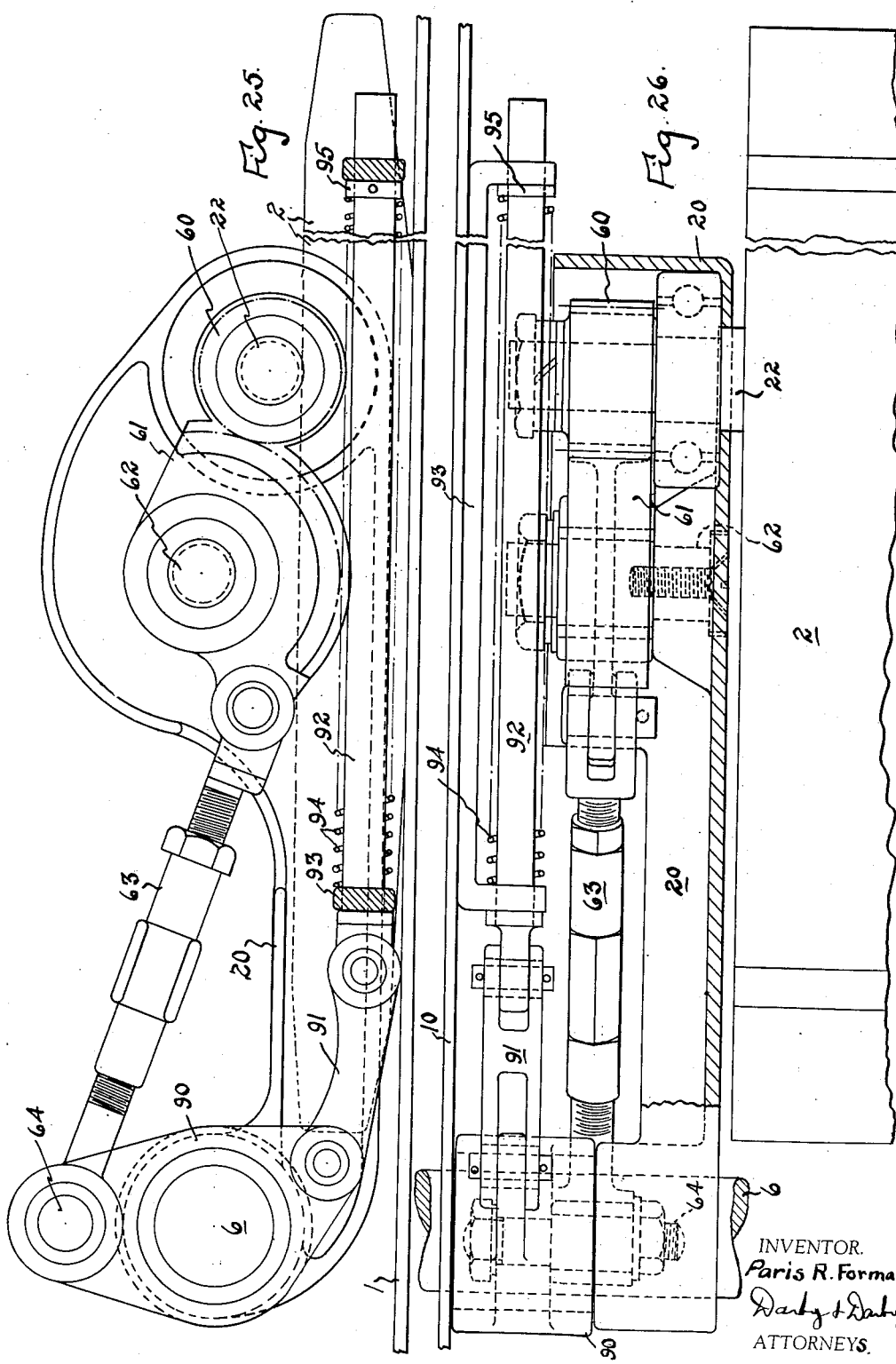
INVENTOR.
Paris R. Forman
Darby & Darby
ATTORNEYS.

Patented Sept. 19, 1939

2,173,475

UNITED STATES PATENT OFFICE 2,173,475

DOOR-OPERATING MECHANISM

Paris R. Forman, Rahway, N. J., assignor to National Pneumatic Company, New York, N. Y., a corporation of West Virginia Application November 30, 1935, Serial No. 52,331

6 Claims. (Cl. 268—30)

This invention relates to improvements in door construction and the operating apparatus therefor as applied to transportation vehicles, such as street cars, buses, subway cars, and the like.

The general object of this invention is to provide a simple and novel door construction particularly adapted for application on vehicles having outwardly curved or bulged sides and operating mechanism therefor.

The many detailed objects of this invention will become apparent from the following disclosure when taken in connection with the attached drawings and the novelty thereof will be pointed out in the appended claims.

This invention resides substantially in the combination, construction, arrangement and relative location of parts, all in accordance with the following disclosure.

In the drawings,

Figure 1 is a side elevational view of a car employing the doors of this invention;

Fig. 2 is an enlarged side elevational view of the doors in closed position;

Fig. 3 is a similar view of the doors in open position;

Fig. 4 is a cross sectional view taken on the line 4—4 of Fig. 2;

Fig. 5 is a cross sectional view taken on the line 5—5 of Fig. 4;

Fig. 6 is a view similar to Fig. 4 but with the doors open as distinguished from the closed position of Fig. 4;

Fig. 7 is a cross sectional view taken on the line 7—7 of Fig. 6;

Fig. 8 is a top plan view over a pair of doors showing the operating motor;

Fig. 9 is a side elevational view of the doors from the outside showing the operating motor;

Fig. 10 is a cross sectional view taken on the line 10—10 of Fig. 9 showing the doors closed;

Fig. 11 is a similar view showing the doors open;

Fig. 12 is a cross sectional view taken on the line 12—12 of Fig. 10;

Fig. 13 is a cross sectional view taken on the line 13—13 of Fig. 12;

Fig. 14 is a cross sectional view taken on the line 14—14 of Fig. 12;

Fig. 15 is an enlarged central, cross sectional view of a modified arrangement;

Fig. 16 is a cross sectional view taken on the line 16—16 of Fig. 15;

Fig. 17 is a top plan view of parts of a modified arrangement;

Fig. 18 is a side elevational view thereof with parts of the door broken away;

Fig. 19 is a top plan view in enlarged detail of part of the mechanism of the arrangement of Figs. 17 and 18;

Fig. 20 is a side elevational view thereof;

Figure 23 is a top plan view of a still further modified arrangement;

Figure 24 is a side elevational view thereof;

Figure 25 is a top plan view partly in section of a final modification; and

Figure 26 is a side elevational view thereof with some parts in cross section.

Figure 21:
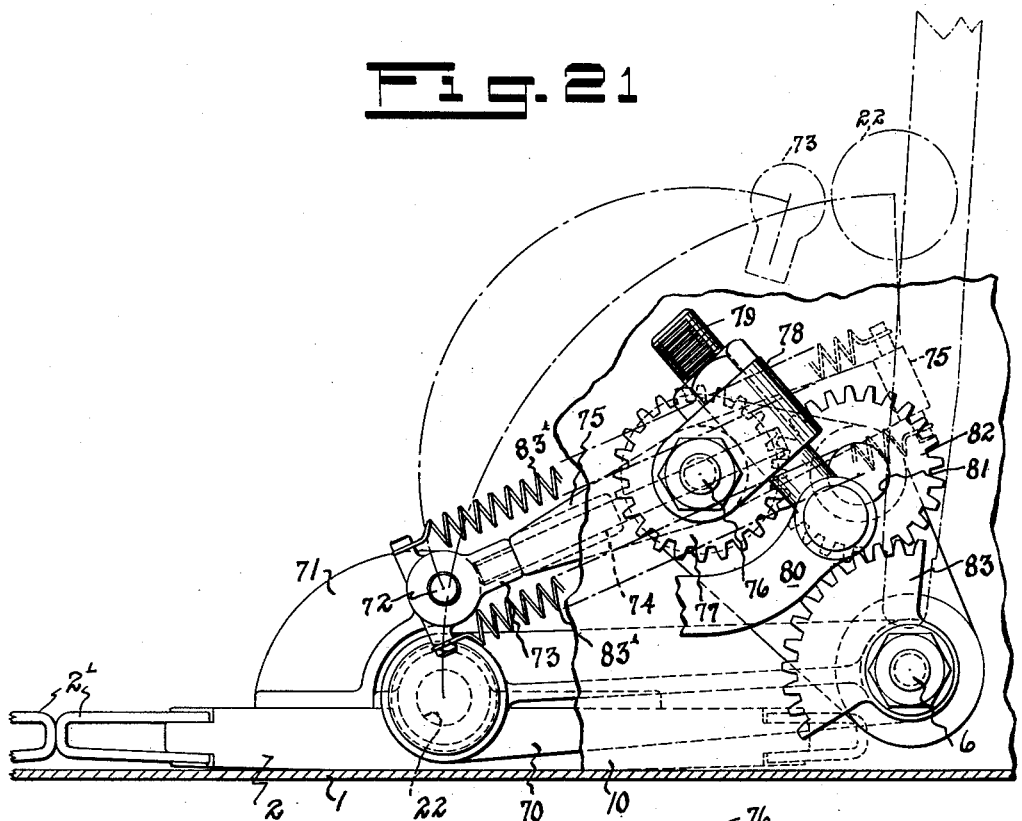
Figure 21 is a top plan view of a further modification.

The car is indicated generally at 1 and provided at the ends and opposite sides thereof with pairs of doors 2, separated by a vertical central standard 3. As is clear in Figure 5, each vertical edge of the door leaves is provided with a flexible edge 2' which in accordance with common practice may consist of a U-shaped channel of resilient material such as rubber secured to the door edges. Just inside the door-way are a pair of steps 4 leading upwardly to the floor level of the car. As is clear from Figures 4 and 6, the doors are outwardly curved to fit the outward curve and bulge of the car. The doors of this invention while particularly adapted for use with cars of this type, which are common in Europe, it will be apparent to those skilled in the art that the invention is not limited to such application. Mounted just inside the door-way in back of the standard 3 is another standard 5 illustrated in the form of a pipe providing a hand or steadying rail for passengers moving over the stairway.

As is clear for example from Fig. 5 there is mounted at each side of the door openings (standard 3 dividing the main opening into smaller openings) the vertical rods 6 which are supported in the floor of the vehicle and the plate 10 over the door-way, and mounted for rotation on their longitudinal axes. Secured to the bottom of each shaft 6 for rotation therewith, is an arm 7 positioned under the lower end of each door leaf 2, and pivotally connected at the transverse center thereof by means of a bracket or plate 8 and a pivot pin 9. These arms serve to support the door leaves 2 at the bottom end so they may pivot on their longitudinal axes. It is noted that as is clear from Figures 5 and 7 the door leaves when open lie in slots 4' formed in the steps 4.

As shown in Figures 8 and 9 there is supported over the doors on the plate 10 the fluid pressure operated door engine 11. It is of course apparent that any suitable type of motor device may be employed for the purpose. The piston rod 12 of the engine is pivotally connected to a link 13 which is in turn pivotally connected to a link 14. This link is provided with an arm 15 which is connected to a segmental gear 16 pivotally mounted on a pivot pin 17 supported on the plate 10. The gear 16 meshes with a segmental gear 18 which is secured to the upper end of the shaft 6. The link 13 is connected by an arm 19 directly to the other shaft 6. Thus, with this arrangement one engine may operate an adjacent pair of leaves. A similar arrangement is provided with the other pair.

Secured to each shaft 6 below the plate 10 is a housing or casing 20 in the form of an arm which is pivotally connected at its free end to a plate or bracket 21, secured to the top of each leaf. The pivot axis of this connection is in longitudinal alignment with the pivot axis of the connection between lever 7 and bracket 8. As previously pointed out, these pivot axes are at the transverse center of each leaf so that it may rotate on the vertical, central axis lying to one side thereof.

Within the housings or casings 20 which are formed of separable parts, is a gear train. The pivot pin 22 by means of which the casing 20 is connected to the bracket 21, has secured thereto a gear 23. It is emphasized that the pivot pin 22 is secured in the bracket 21 so that they must rotate together and the gear 23 is connected to the pin 22 so that they must rotate together. The gear 23 meshes with the idler pinion 24 journaled in the casing 20 and, in turn, meshing with a segmental gear 25 likewise journaled on and in the casing 20. The segmental gear 25 is pivotally connected by means of a link or rod 26 which has a sliding connection with an arm 27. As is clear from Fig. 12, the arm 27 is of yoke formation, and the rod 26 slides in the arms of the yoke. At 26' is a collar secured to the rod 26 and positioned to engage one of the arms of the yoke. A coil spring 29 encircles the rod and lies between one arm of the yoke and the collar 26'. The arm 27 is pivotally mounted on a fixed pivot pin 28 which depends from the plate 10.

The description of the operation will begin with the assumption that the doors are in closed position as shown in Figures 8 and 9. When fluid pressure is supplied to the engine, (it being illustrated as of the differential fluid pressure operated type) piston rod 12 moves to the left, Fig. 8. It is noted that the particular engine shown is the type in which the smaller cylinder at the right hand end is fully open so that the right hand end face of the smaller piston is exposed to the atmospheric pressure.

This movement of piston rod 12 carries links 13 and 14 with it as well as the arms 15 and 19 imparting rotation in the right hand shaft 6 which is directly connected to the arm 19 and rotation to segmental gear 16. As is apparent from Fig. 8, the right hand shaft 6 will be rotated in a clockwise direction and segmental gear 16 will drive segmental gear 18 in a clockwise direction carrying shaft 6 with it. It is here noted that the arm or bracket 15 is pivotally connected to the link 14. This movement of shaft 6 will cause a similar movement of the arm 20. The counterclockwise rotation of arm 20, see Fig. 10, will cause door 2 to pivot on the axis of pins 22 and 9 by reason of the fact that segmental gear 25 is prevented from having any rotation with respect to pin 22. This is due to the fact that segmental gear 25 is connected by the link 26, arm 27, and spring 29 to the fixed pivot pin 28. For this reason as the left hand arm 20 swings in a counterclockwise direction, segmental gear 25 will be caused to rotate, carrying the door leaf 2 with it with respect to the arm 20 because of the connection of gear 23 through idler 24 with the gear 25. It will be remembered that the door leaves are connected to the shaft 6 at the lower end through the lever 7. Thus, the doors will swing bodily about the axis of shaft 6 as it turns. At the same time the door will rotate on its longitudinal axis so that the door will describe a sort of sweeping movement from the position shown in Fig. 5 to the position shown in Fig. 7. Consideration will show that gear 23 and hence the door leaves will have a counterclockwise rotation, (Fig. 10) for the left hand door. A similar but reverse action will occur for the right hand door. Thus the door moves from the position shown in Fig. 10 to the position shown in Fig. 11 with a combined swinging and rotating movement which is partly indicated by the dotted outlines in Fig. 11. In the reverse operation when the doors are closing, the shafts 6 are caused to revolve in the opposite direction by exhausting fluid pressure from the larger cylinder of the engine 11 to which fluid pressure was fed in the opening operation. The result is that the doors will describe the same path but in the reverse direction. If in closing the doors meet an obstruction, such as the body of a passenger, no injury will be done because of the sliding connection between the arm 27 and the rod 26. If the doors are stopped by a part of a passenger's body, such as an arm caught between them, the engine will continue its closing movement but the doors will not exert an injurious pressure as the engine movement and connected parts will be taken up by the compression of springs 29.

In the modified arrangement of Figs. 15 and 16, all the equipment is the same with the exception of the construction within the casing arms 20. In this case the gear 23 is mounted between the arms of a U-shaped clip 42 which is rotatably mounted on the pivot pin 22. The gear 23 is as before locked thereon as shown by the square shaft section in Fig. 16. However, the portion of the shaft which engages the arms of the clips 41 is circular so that the clip may have relative movement with respect thereto. Rotatably mounted on this clip are a pair of rollers 42. Passing through the clip is a rack 40, the teeth of which engages the gear 23 and the back of which rests against the rollers 42. As before the other end of the rack corresponding to rod 26, passes through the arms of the yoke 43 which arm is pivotally mounted on the fixed pivot pin 45 secured to the plate 10. The rack rod 40 is provided with a collar 50 and a spring 44 as before. In this arrangement referring to Fig. 16 when shaft is given a counter clockwise rotation carrying arm 20 with it, gear 23 will be given a clockwise rotation since rack 40 cannot slide because of the fixed collar 50 which engages the yoke cam. This will in effect cause the gear 23 to roll along the rack giving it and the door a clockwise rotation at the same time as it swings upwardly and to the left. The rollers 42 merely hold the rack 40 in engagement with the gear 23, and the clip 41 is free on the pivot pin to rotate. In other words, the pivot pin 22 actually turns in the clip as the door rotates. Otherwise the operation of the mechanism is the same as previously given. As before if the door meets an obstruction in closing, the continued movement of shaft 6 and arm 20, will cause no injury since the rack 40 may slide in the yoke 43 against the action of spring 44.

The modification of Figures 17 to 20 will now be described. In these figures only a portion of one of the door leaves is shown, but as before, the apparatus will be duplicated for each additional door leaf. As shown in Figure 18 the door is supported as before from the bottom by a lever 7 connected to the door shaft 6, and a pivot pin 9 mounted in a fixture on the bottom of the door (not shown). The axis of the pin 9 coincides with the vertical central axis of the door. In Fig. 18 the manner of supporting the lower end of the door shaft 6 which construction may be used in all forms of the invention, is illustrated. A plate 52 which may be attached to any suitable part of the vehicle structure, has a ball end pin 53 mounted thereon and riding in a recess in the end of the shaft. As before the upper end of the door 2 is pivotally supported from the lever 20 extending from the shaft 6 on a pivot pin 22 which is attached to the door by means of a fixture (not shown) like the fixture 21 of the other view.

Supported on plate 10 above the door, is a pivot pin 54 upon which is mounted for rotation therewith, a segmental gear 55 and a short lever 56. The lever 56 is provided with an arm 57 by means of which the mechanism is attached to the door operating motor (not shown). Gear 55 meshes with a segmental gear 58 mounted on and secured to the upper end of the door shaft 6 which is mounted at this end in the bearing 59.

As shown in Figures 19 and 20, the pin 22 extends through a bearing in the hollow lever 20 and has secured thereto for rotation therewith a gear 60. It may be noted here for emphasis that the pin 22 has no rotation with respect to the door 2. Gear 60 meshes with a segmental gear 61 journaled for rotation upon a pivot pin 62 mounted in the lever 20. The gear 61 is pivotally connected to an adjustable link 63 which in turn is pivotally mounted on a pivot pin 64, supported in the plate 10.

In the operation of this mechanism when gear 55 is rotated by the motor from the position shown in Figure 17 in a clockwise direction, gear 58 and shaft 6 are rotated in a counterclockwise direction. This causes levers 20 and 7 to rotate in a counterclockwise direction, Figure 17. As the door begins to swing with the levers, it also begins to rotate on its central axis. This occurs by reason of the fact that segmental gear 61 is secured to the fixed pivot pin 64. Thus as arm 20 swings, relative movement occurs between the gears 61 and 60 with the result that the door rotates on its vertical axis, i. e. the axis of the pins 19 and 22. The door therefore swings to full open position with a sort of sweeping movement which is a combination of the rotational movement of the entire door about the axis of shaft 6 and a rotational movement of the door about its vertical axis.

Figure 22:
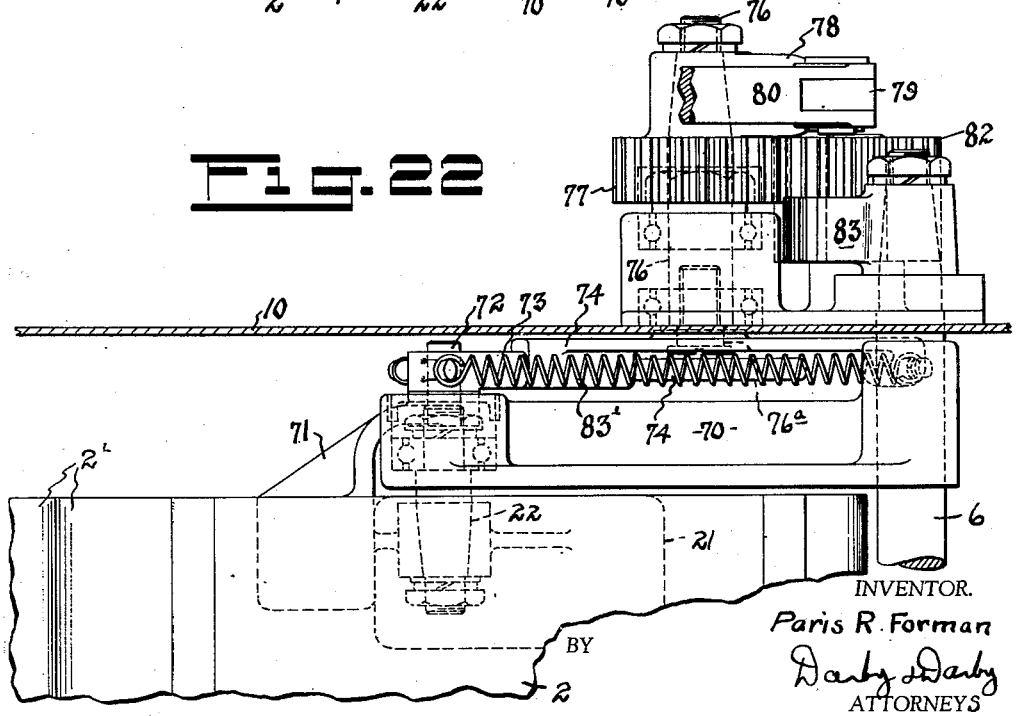
Figure 22 is a side elevational view thereof showing a portion only of the door.

Another modified arrangement employing the principles of this invention is illustrated in Figures 21 and 22. The door 2 is supported from the shaft 6 at the bottom as before and at the top by means of a simple lever 70 which is pivotally connected to the pivot pin 22 attached to the upper end of the door by means of the plate 21. The pivot pin 22 may turn in the end of lever 20 but cannot turn with respect to the door. At 71 is a curved bracket secured to the door adjacent the plate 21. Pivotally connected to this bracket at 72 is a member 73 in which a rod 74 is secured. Slidingly engaging the rod 74 is a lever 75 which is secured to a short shaft or pivot pin 76 mounted in a bearing supported from the overhead plate. Mounted on the pin 76 for rotation therewith is a gear 77 as well as a short lever 78 which supports an arm 79. A part of the link which pivotally connects the arm 79 with the motive device (not shown) is illustrated at 80. Meshing with the gear 77 is a gear 82 which is rotatably mounted on the pivot pin 81 supported from the plate 10. This gear 82 is an idler gear and meshes with a segmental gear 83 secured to the upper end of the shaft 6. Extending between the member 73 and the far end of lever 75 are a pair of coiled springs 83'.

In the operation of this device the shaft or pin 76 is rotated by the motive device. As it rotates, gears 77, 82 and 83 are rotated as well as arms 75 and 70. Thus, the door as a unit swings in a clockwise direction, Figure 21. As it swings it pivots about its central, vertical axis as in the case of the other modification. The center of pin 22 swings in a curved path, the radius of which is a distance between the pin 22 and the center of shaft 6. At the same time the center of the pivot 72 swings in a curved path, the radius of which is the distance between the center of pivot point 72 and the center of pivot pin 76. These two curved paths are indicated by a dot and dash line, Fig. 21. The result is that the door also rotates on its vertical central axis to the dotted position shown in Figure 21. The sliding connection between the member 73 and the lever 75, is provided so that in an emergency with the doors closed, passengers may swing them open by pressing on the outside edge of each door leaf. The door leaves will then rotate on their vertical axes and the passenger will only have to overcome the resistance of springs 83'. If a rigid connection were used the passenger would have to overcome resistance of the motor which might be considerable. The gear train 77, 82 and 83, in addition to causing operation of the mechanism, prevents any one from accidentally displacing the doors by applying pressure thereto so as to get them out of proper relative position. In other words, if the power were applied to the pivot shaft 76, and gears 82, and 83 were omitted, the door could be opened and closed, but at the center of its swing if pressure were applied to it, it could be kicked around on its vertical axis, throwing it out of proper position. The gear train prevents this.

In the modified arrangement of Figures 23 and 24 the door 2 is pivotally connected by the pin 22 to the lever 70 which is secured to the door shaft 6, similar to the arrangement of Figures 21 and 22. The bracket 71 is mounted on the door adjacent the pivot pin 22 and has pivotally mounted thereon at 72 a member or block 73a in which are rigidly mounted a pair of rods 74a upon which the springs 83a are mounted. Slidably mounted on the rods 74a is a cross head 73b upon which the springs 83a bear. Secured to the cross head 73b is a pivot pin 75a by means of which the lever 75 is pivotally connected to the cross head. This lever 75 is secured to the short shaft or pin 76 upon which the gear 77 is mounted for rotating it. Also secured to pin 76 for rotation therewith is the arm 78 in which the arm or lever 79 is mounted. At 80 is the link which pivotally connects the motive device (not shown) with the lever 79. Another gear 82 is pivotally mounted on the shaft 81 and meshes with the gear 77 and with a segmental gear 83 secured to the door shaft 6. In the operation of this device, when the gear 77 is rotated in a clockwise direction by the motive device, segmental gear 83 and door shaft 6 are rotated in a counterclockwise direction. This swings the lever 70 in a counterclockwise direction, carrying the door 2 with it. Rotation of gear 77 carries lever 75 with it with the result that the arms 74ᵃ and the block 73ᵃ swing in a counterclockwise direction on the pivot pin 72. Because of the distance between the center of shaft 22 and the pivot 72, the door also rotates on the end of lever 70 as it swings to one side so it assumes the dot dash position shown in Figure 23 when fully opened in a manner similar to the previous arrangement. In closing the parts of course move in the opposite directions respectively.

The feature of this construction is that the doors may be swung open manually against the resistance of springs 83ᵃ, without the necessity of manually moving the motive device. Thus when the doors are closed and pressure is applied on the edges 2' thereof from the inside of the car the doors may pivot on the ends of the levers 70. As this occurs the cross head 73ᵇ may pivot on the end of roller 75 and slide along the rods 74ᵃ compressing the springs 83ᵃ. The rods may also swing on the pivot pin 72. Thus the doors may be swung open about the pivot pins 22 against the resistance of springs 83ᵃ only. In other words, the doors may be swung open manually by direct pressure thereon without operation of the gear train or movement of the motive device. The doors are of course supported from below on pivot pins directly under the pivot pins 22 as in the case of all the other forms of apparatus described.

The final modification of Figures 25 and 26 involves an arrangement where the motive device is connected directly to the door shaft 6 by mechanism not shown in these figures but similar to the mechanism for examples of Figures 8 and 9. As before the box like lever 20 is secured to the shaft 6 for rotation therewith. The central pivot pin 22 is employed as before which extends into the box like lever 20 and has mounted thereon a gear 60 which meshes with a segmental gear 61 pivotally mounted on the bearing pin 62 in the lever 20.

With this arrangement, however, there is a collar 90 rotatably mounted on the shaft 6 and provided with a pair of substantially oppositely extending short arms. An adjustable link 63 is pivotally connected between the segmental gear 61 and the pivot pin 64 on one of the arms of the collar 90. The other arm of the collar 90 is pivotally connected through link 91 to a rod 92 slidably mounted in a bracket 93 supported in the plate 10 or other suitable fixed support. A spring 94 surrounds the rod 92 and lies between the brackets 93 at one end and the collar 95 secured to the shaft as shown. The door is opened and closed as previously described by power operation of shaft 6. The feature of construction here illustrated is that of permitting the manual opening of the doors by direct pressure thereon about the pivot pin 22 and the lower supporting pivot pin (not shown), corresponding to the pivot pin 9 of Figure 6. When the door is opened manually the pressure applied on its inner edge will cause it to rotate about the pivot pin 22 since this pivot pin is secured to the door for rotation with it. Gear 60 will rotate in a clockwise direction causing segmental gear 61 to rotate in a counterclockwise direction. This movement of the segmental gear will cause the collar 90 to rotate in a clockwise direction on shaft 6 through its connection with the segmental gear by the link 63. The result is that rod 92 will slide to the left (Figure 25), compressing spring 94. Thus in manually opening the door with this arrangement a passenger need only overcome the resistance of the spring 94 since shaft 6 is still in operation.

It is to be noted that one of the important features of the construction of this invention consists in the enclosing of much, and in some cases most of the operating apparatus within one of the supporting levers for the door. This is an important advantage from a practical angle where in vehicles such as street cars, buses and the like there is not much room for mounting door operating equipment. By enclosing a substantial part of the operating equipment within the door supporting lever itself the structure is particularly adapted for use in places where there is a minimum amount of room available.

From the above description it will be apparent that this invention resides in certain principles of construction and operation which may be embodied in other physical forms without departure from the scope thereof. I do not, therefore, desire to be strictly limited to the disclosure as given for purposes of illustration, but rather to the scope of the appended claims.

What I seek to secure by United States Letters Patent is:

1. In a door operating mechanism the combination comprising a power operated shaft, a pair of levers connected to said shaft, a door pivotally supported on said levers by pivot pins, one of said pivot pins being secured to the door for rotation therewith, a gear secured to said pivot pin, a segmental gear pivotally mounted adjacent the said first gear and meshing with said gear and a lever pivotally mounted on a fixed pivot pin and connected to said segmental gear whereby the door rotates as the levers swing to one side.

2. A door operating apparatus as described comprising a door shaft, a door rotatably supported on a pair of arms secured to said shaft, means for rotating said shaft, means connected to the door to cause it to rotate on its axis of support on the levers as it swings with the door shaft, said last mentioned means including a pair of gears rotatably mounted on one of said levers, one of said gears being connected to the door, and means for pivotally connecting the other of said gears to a fixed pivot point.

3. In a door operating mechanism the combination comprising a rotatably supported shaft, a door, a pair of levers connected to said shaft upon which the door is pivotally mounted, a gear train rotatably mounted on one of said levers and connected to said door, and means for causing rotation of the gears as said shaft swings said levers.

4. In a door operating mechanism the combination comprising a rotatably supported door shaft, a pair of levers secured to said shaft, a door pivotally mounted between said levers, a gear secured to said door for rotation with it, a second gear meshing with said first gear, a collar rotatably mounted on said door shaft, a link pivotally interconnecting the second gear with said collar, and resilient means pivotally connected to said collar whereby the door may be manually opened against the resistance of said resilient means.

5. In a door operating mechanism, the combination comprising a rotatably supported shaft, a pair of levers secured to said shaft for movement therewith, a door pivotally mounted on said levers, a gear secured to the door for movement therewith, a second gear meshing with said first gear, a movably supported member, resilient means for resisting movement of said member, and a link pivotally interconnecting said second gear and said member whereby the connection of the link to the member forms a fixed pivotal point when the door is being operated by said shaft and a movable pivotal point when the door is manually operated by pressure thereon to open it against the resistance of said resilient means.

6. A door operating mechanism comprising a door, a door operating shaft, a pair of levers secured to the shaft, said door being pivotally mounted thereon, one of said members being in the form of a casing, a gear train mounted in said casing and connected to the door, and means for effecting relative rotation of the gear train as the shaft swings the door to one side whereby the door pivots on said levers.

PARIS R. FORMAN.